(12) United States Patent
Peng et al.

(10) Patent No.: US 7,924,556 B2
(45) Date of Patent: Apr. 12, 2011

(54) MOUNTING APPARATUS FOR DATA STORAGE DEVICE

(75) Inventors: Wen-Tang Peng, Taipei Hsien (TW); Guang-Yi Zhang, Shenzhen (CN); Jia-Qi Fu, Shenzhen (CN); Yue-Shu Lin, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 25 days.

(21) Appl. No.: 12/554,969

(22) Filed: Sep. 7, 2009

(65) Prior Publication Data

US 2010/0271772 A1    Oct. 28, 2010

(30) Foreign Application Priority Data

Apr. 22, 2009  (CN) .......................... 2009 1 0301745

(51) Int. Cl.
*G06F 1/16* (2006.01)
(52) U.S. Cl. ........... 361/679.31; 211/126.12; 206/534.1; 720/614
(58) Field of Classification Search ................. 211/59.3, 211/134, 126.12; 312/334.44, 246, 268, 312/223.1; 206/214, 538, 534.1, 521.1; 720/610, 720/607, 600, 614, 601; 353/103, 116; 361/695, 679.31, 679.32, 679.33, 679.34, 679.35, 679.36, 679.37, 679.01, 679.46, 679.28, 679.4
See application file for complete search history.

(56) References Cited

U.S. PATENT DOCUMENTS

| | | | |
|---|---|---|---|
| 6,442,019 B1* | 8/2002 | Lim | 361/679.4 |
| 2006/0002077 A1* | 1/2006 | Carlson et al. | 361/685 |
| 2010/0281199 A1* | 11/2010 | Fu et al. | 710/300 |

* cited by examiner

*Primary Examiner* — Hung V Duong
(74) *Attorney, Agent, or Firm* — Zhigang Ma

(57) ABSTRACT

A mounting apparatus includes a receiving tray receiving a data storage device, a rack receiving the receiving tray, a rotatable shaft, two pivoting members fixed to the rotatable shaft, two resilient members, and a cover detachably mounted to the rack. The clamping protrusion protrudes out from the receiving tray. The rotatable shaft includes a latching portion. The resilient members are mounted to the corresponding pivoting members, and each resilient member resists against the rack and the corresponding pivoting member. When the cover is mounted to the rack, the pivoting members are rotated together with the rotatable shaft. Therefore, the latching portion rotates to engage with the clamping protrusion, and the resilient members are deformed. When the cover is removed from the rack, the resilient members are released to rotate the pivoting members together with the rotatable shaft. The latching portion rotates to disengage from the clamping protrusion.

18 Claims, 4 Drawing Sheets

MOUNTING APPARATUS FOR DATA STORAGE DEVICE

BACKGROUND

1. Technical Field

The disclosure relates to mounting apparatuses for data storage devices, and particularly to a mounting apparatus that readily secures a plurality of data storage devices in a computer enclosure and allows convenient assembly of the data storage devices.

2. Description of Related Art

Generally speaking, when a computer is assembled, a rack is mounted in a computer enclosure, and then data storage devices are attached to the rack by screws. However, during installation or removal of the data storage device, one or more of panels of the computer enclosure must be removed. During removal of the data storage device, the screws must further be removed one by one to free the data storage device after removing the panels of the computer enclosure. This is time-consuming and cumbersome. In addition, in this process, one or more of the screws can easily fall into the packed interior of the computer enclosure, thereby creating a difficult retrieval.

DETAILED DESCRIPTION

Figure 1:
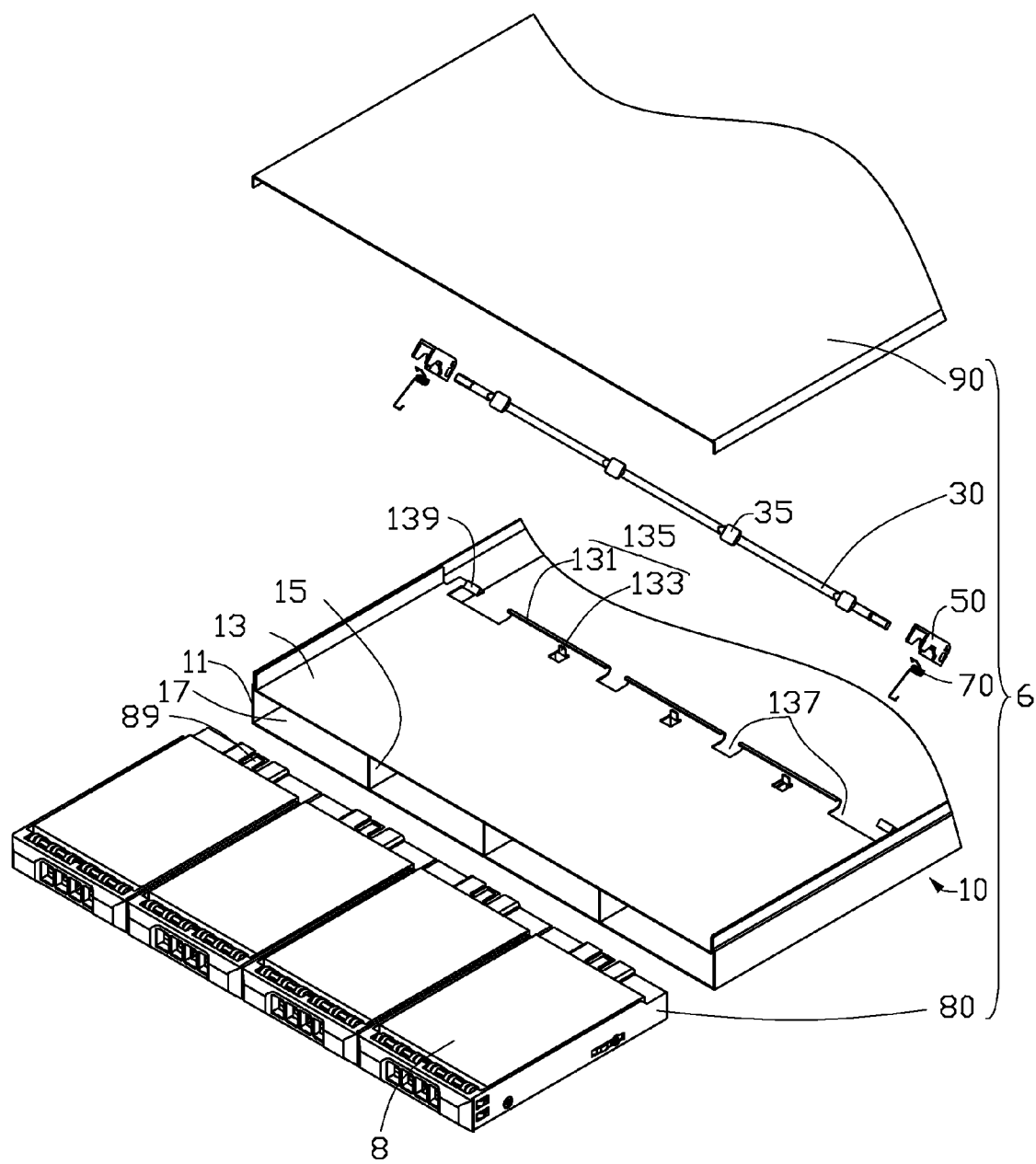
FIG. 1 is an exploded, isometric view of an exemplary embodiment of a mounting apparatus together with a data storage device, the mounting apparatus includes two pivoting members, a rotatable shaft, and two resilient members.

Referring to FIG. 1, an exemplary embodiment of a mounting apparatus 6 is provided to hold a data storage device 8. The mounting apparatus 6 includes a receiving tray 80 for receiving the data storage device 8, a rack 10, a cover 90, a rotatable shaft 30, two pivoting members 50, and two resilient members 70.

Figure 2:
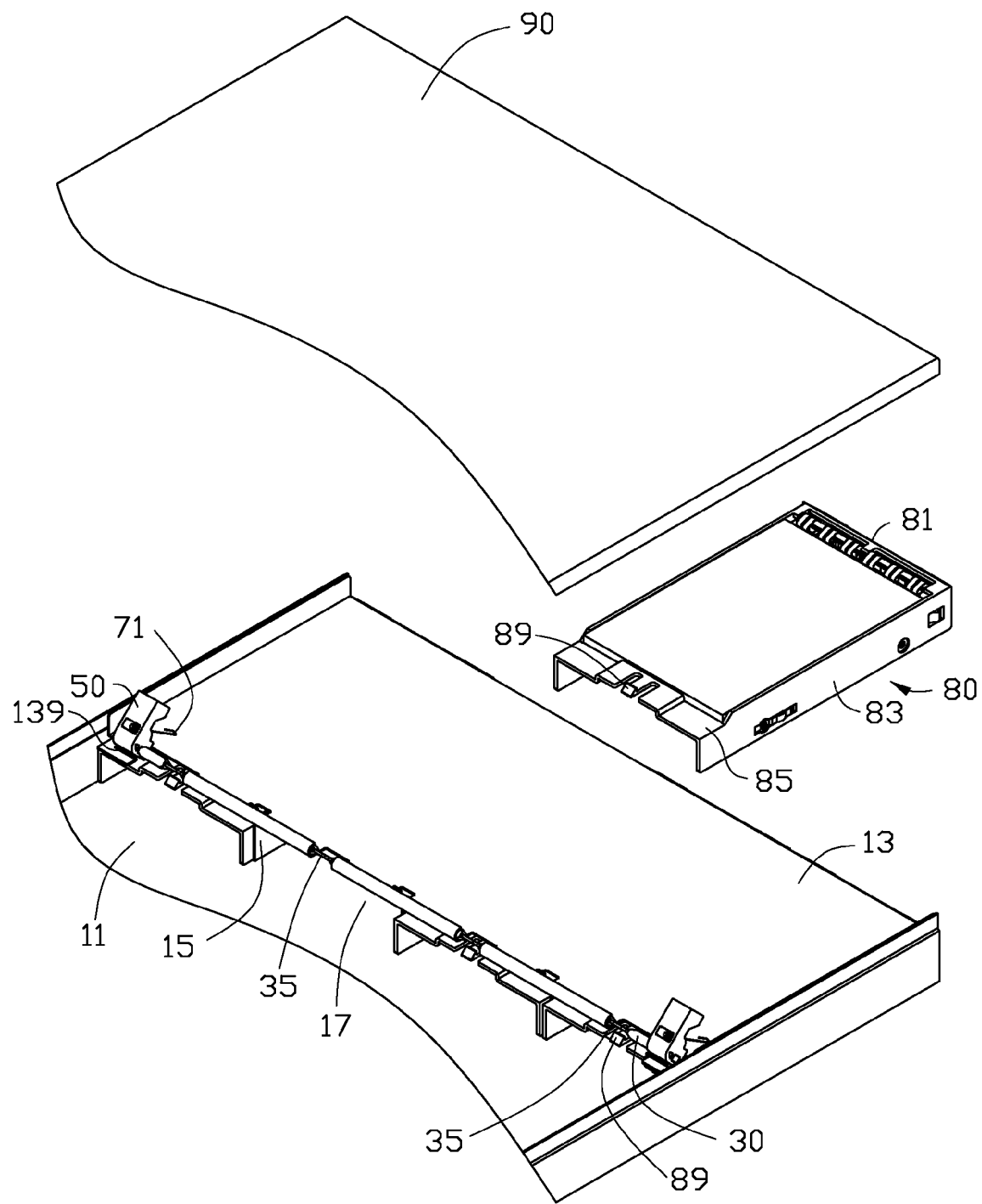
FIG. 2 is a partially assembled, isometric view of FIG. 1, but viewed from another perspective relative to FIG. 1.

Referring to FIG. 2, the receiving tray 80 includes a panel 81, two sidewalls 83 perpendicularly extending from opposite ends of the panel 81, and a connecting side 85 connected to the sidewalls 83. The connecting side 85 is perpendicular to the panel 81, and located at distal ends of the sidewalls 83 away from the panel 81. An elastic clamping protrusion 89 protrudes from a center of the connecting side 85, and two slots (not labeled) are defined in the connecting side 85 adjacent opposite sides of the clamping protrusion 89. The two slots are configured for deforming the clamping protrusion 89. The data storage device 8 is received in the receiving tray 80, and sidewalls of the data storage device 8 resist against the panel 81, the sidewalls 83 and the connecting side 85.

The rack 10 includes a bottom plate 11 and a fixing plate 13 parallel to the bottom plate 11. A plurality of partitions 15 perpendicularly extend up from the bottom plate 10 to connect to the fixing plate 13. Therefore, a receiving room 17 is formed between adjacent partitions 15, for receiving one of the receiving trays 80. Two resisting portions 139 obliquely extend upwards from opposite ends of a rear side of the fixing plate 13 correspondingly. A middle portion of the rear side of the fixing plate 13 is bent to form a curled sleeve 131. A plurality of cutouts 137 are defined in the fixing plate 13 separating the curled sleeve 131 into a plurality of sections. The cutouts 137 communicate with receiving rooms 17 correspondingly. A clamping tab 133 protrudes from the fixing plate 13 adjacent each section of the curled sleeve 131 correspondingly. The plurality of clamping tabs 133 and the curled sleeve 131 form a clamping unit 135 for rotatably clamping the rotatable shaft 30.

Figure 4:
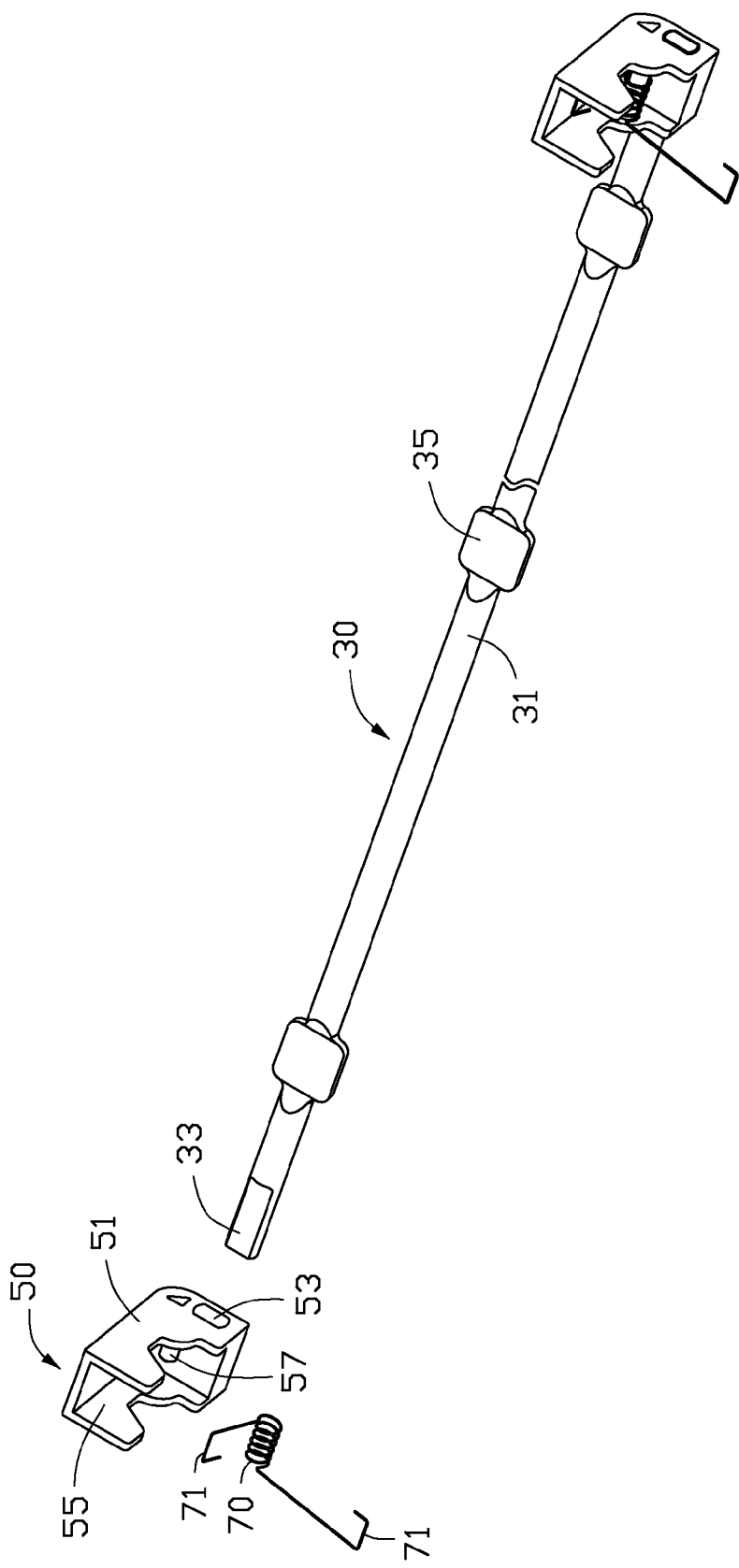
FIG. 4 is an enlarged view of the pivoting members, the rotatable shaft, and the resilient members of FIG. 1.

Referring to FIG. 4, the rotatable shaft 30 includes a cylindrical shaft body 31, and two fixing portions 33 located at opposite ends of the shaft body 31. Each fixing portion 33 has a double-D shaped cross-section. A plurality of flat latching portions 35 are formed on the shaft body 31 separating the shaft body 31 into a plurality of sections. In one embodiment, the plurality of flat latching portions 35 are formed by beating the shaft body 31. Each latching portion 35 has a greater width than a diameter of the shaft body 31 so as to engage with the clamping protrusion 89 of the receiving tray 80. In another embodiment, the plurality of latching portions 35 radially extend from a circumference of the shaft body 31.

Each pivoting member 50 includes a main body 51 defining a double-D shaped fixing hole 53, corresponding to a corresponding fixing portion 33 of the rotatable shaft 30. A through slot 55 is defined in the main body 51, for receiving one of the resilient members 70 correspondingly. A post 57 extends from an inner side of the through slot 55, parallel to the fixing hole 53.

In this embodiment, each resilient member 70 is a torsion spring, and includes two resisting legs 71.

Figure 3:
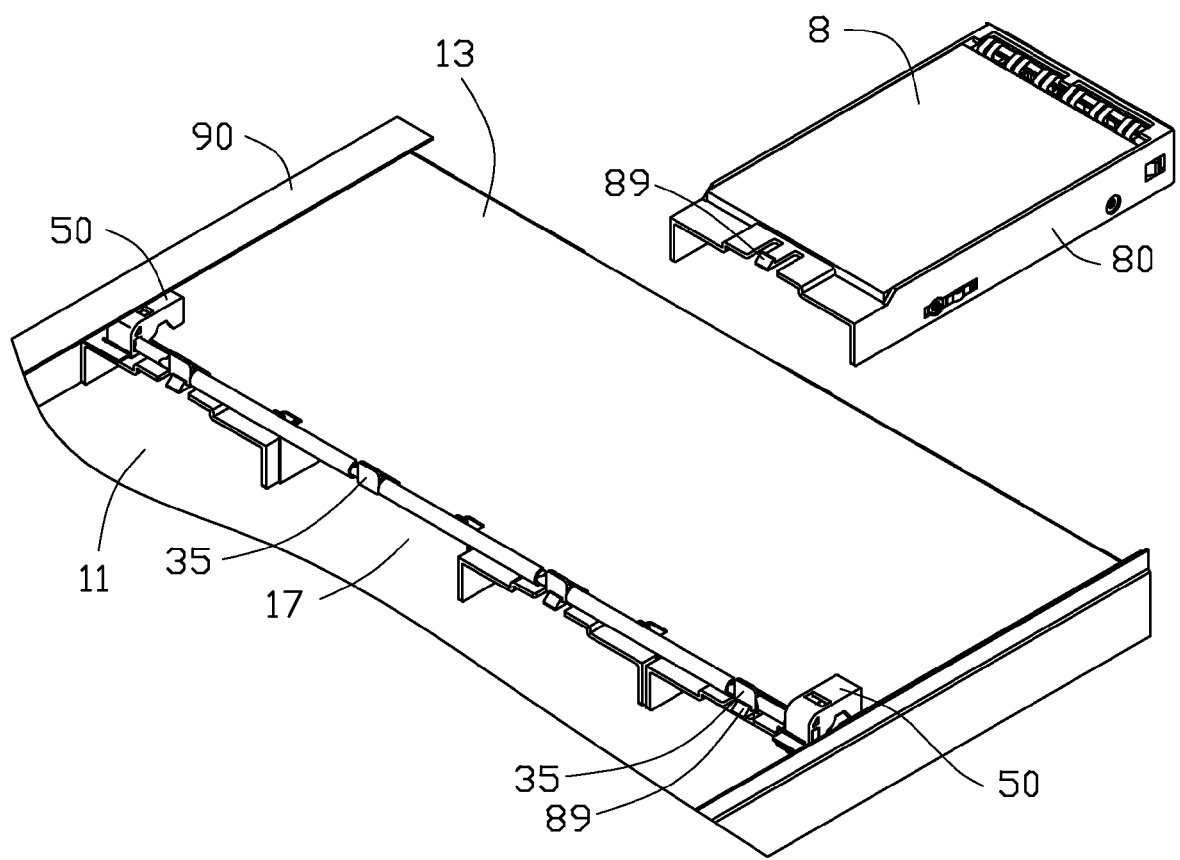
FIG. 3 is an assembled, isometric view of the mounting apparatus of FIG. 1.

Referring to FIGS. 2 and 3, in assembly, the fixing portions 33 of the rotatable shaft 30 are fixedly inserted in the fixing holes 53 of the pivoting members 50, correspondingly. Therefore, the pivoting members 50 are non-rotatably mounted to opposite ends of the rotatable shaft 30. Each resilient member 70 fittingly sleeves on the post 57 of the corresponding pivoting member 50. The rotatable shaft 30 is rotatably received in the clamping unit 135 of the rack 10, with the plurality of latching portions 35 of the rotatable shaft 30 aligned with the corresponding cutouts 137 of the rack 10. The shaft body 31 of the rotatable shaft 30 is clamped by the curled sleeve 131 and the plurality of clamping tabs 133 of the clamping unit 135. The pivoting members 50 are aligned with the corresponding resisting portions 139 of the rack 10. As a result, the resisting legs 71 of each resilient member 70 resist against the corresponding pivoting member 50 and the fixing plate 13, correspondingly. Therefore, the elasticity of the resilient members 70 drives the pivoting members 50 to rotate against the corresponding resisting portions 139, thereby, preventing the rotatable shaft 30 from over-rotating relative to the fixing plate 13.

The receiving tray 80 with the data storage device 8 is received in the receiving room 17, and the clamping protrusion 89 of the receiving tray 80 is aligned with one corresponding cutout 137. The cover 90 is fixed to the rack 10, thereby, the cover 90 urges the pivoting members 50 to rotate towards the fixing plate 13. As a result, the rotatable shaft 30 rotates together with the pivoting members 50 and the plurality of latching portions 35 rotates into the corresponding cutouts 137, therefore one of the plurality of latching portions 35 is engaged with the clamping protrusion 89, to prevent the receiving tray 80 from disengaging from the receiving room 17. The resilient members 70 becomes deformed.

In addition, the cover 90 can first be fixed to the rack 10, and the plurality of latching portions 35 of the rotatable shaft 30 are received in the corresponding cutouts 137 of the rack 10. afterwards, the receiving tray 80 is pushed into one of the receiving rooms 17. Therefore, the clamping protrusion 89 of the receiving tray 80 deforms under pressure from the corresponding latching portion 35. The clamping protrusion 89 moves beyond the latching portion 35 when the receiving tray 80 is moved completely in the receiving rooms 17. Correspondingly, the clamping protrusion 89 returns to normal and resists the latching portion 35. Therefore, the data storage device 8 is fixed to the rack 10, without removing the cover 90, which is convenient to use.

To detach the data storage device 8, the cover 90 is removed from the rack 10. The resilient members 70 are released to rotate the pivoting members 50 to resist against the resisting portions 139 of the rack 10. Therefore, the rotatable shaft 30 is rotated away from the fixing plate 13 of the rack 10. As a result, the latching portion 35 of the rotatable shaft 30 rotates out from the cutout 137 of the rack 10, and the latching portion 35 is disengaged from the clamping protrusion 89 of the receiving tray 80. Finally, the receiving tray 80 can be drawn out from the rack 10, and then, the data storage device 8 can be conveniently pushed out of the receiving tray 80.

Obviously, in other embodiments, the mounting apparatus 6 may include only one pivoting member 50 mounted to the rotatable shaft 30, and one resilient member 70 mounted to the pivoting member 50.

It is believed that the present embodiments and their advantages will be understood from the foregoing description, and they will be apparent that various changes may be made thereto without departing from the spirit and scope of the description or sacrificing all of their material advantages, the examples hereinbefore described merely being exemplary embodiment.

What is claimed is:

1. A mounting apparatus for a data storage device, the mounting apparatus comprising:
    a receiving tray for receiving the data storage device, a clamping protrusion protruding out from the receiving tray;
    a rack comprising a receiving room to receive the receiving tray;
    a rotatable shaft rotatably mounted to the rack, the rotatable shaft comprising a latching portion aligned with the clamping protrusion;
    two pivoting members fixedly mounted to opposite ends of the rotatable shaft, to rotatably mount the rotatable shaft to the rack;
    two resilient members mounted to the corresponding pivoting members, each resilient member resisting against the rack and the corresponding pivoting member; and
    a cover detachably mounted to the rack;
    wherein during the cover being mounted to the rack, the cover resists against the pivoting members, the pivoting members are rotated together with the rotatable shaft, the latching portion rotates to engage with the clamping protrusion, the resilient members are deformed;
    When the cover is removed from the rack, the resilient members are released to rotate the pivoting members together with the rotatable shaft, the latching portion rotates to disengage from the clamping protrusion.

2. The mounting apparatus of claim 1, wherein the rack comprises a bottom plate and a fixing plate apart from the bottom plate, two partitions extend from the bottom plate to connect to the fixing plate, the receiving room is bound by the bottom plate, the fixing plate, and the two neighboring partitions.

3. The mounting apparatus of claim 2, wherein each resilient member comprises two resisting legs, the resisting legs resist against the fixing plate and the corresponding pivoting members, correspondingly.

4. The mounting apparatus of claim 2, wherein the fixing plate comprises a clamping unit, the rotatable shaft is rotatably mounted to the clamping unit.

5. The mounting apparatus of claim 4, wherein the clamping unit comprises a curled sleeve, and a plurality of clamping tabs each resisting against the rotatable shaft, the curled sleeve is clamped against a circumference of the rotatable shaft.

6. The mounting apparatus of claim 5, wherein the curled sleeve is bent from a side of the fixing plate, each clamping tab extends from the fixing plate, neighboring the curled sleeve.

7. The mounting apparatus of claim 2, wherein two resisting portions extend from the fixing plate, the pivoting members are operable to resist against the corresponding resisting portions, to prevent the pivoting members from over-rotated, correspondingly.

8. The mounting apparatus of claim 2, wherein the fixing plate defines a cutout communicating with the receiving room, the latching portion is aligned with the cutout, when the rotatable shaft is rotated, the latching portion is moved into or out of the cutout.

9. The mounting apparatus of claim 1, wherein each pivoting member defines a fixing hole, the rotatable shaft comprises two fixing portions located at opposite ends of the rotatable shaft, each fixing portion is engaged in the fixing hole of a corresponding pivoting member.

10. The mounting apparatus of claim 9, wherein the rack comprises a clamping unit, the rotatable shaft further comprises a shaft body rotatably received in the clamping unit, the latching portion is located on the shaft body.

11. The mounting apparatus of claim 1, wherein each pivoting member defines a through slot, a post extends from one inner sidewall of the through slot, one of the resilient member is mounted to the post and received in the through slot.

12. A mounting apparatus for mounting a data storage device, the mounting apparatus comprising:
    a receiving tray for receiving the data storage device, a clamping protrusion protruding out from the receiving tray;
    a rack comprising a receiving room to receive the receiving tray;
    a rotatable shaft rotatably mounted to the rack, the rotatable shaft comprising a latching portion aligned with clamping protrusion;
    a pivoting member fixedly mounted to the rotatable shaft, and moved together with the rotatable shaft;
    a resilient member mounted between the pivoting member and the rack; and
    a cover detachably mounted to the rack;
    wherein when the cover is mounted to the rack, the pivoting member is rotated towards the rack to distort the resilient member, the latching portion rotates to engage with the clamping protrusion; when the cover is removed from the rack, the resilient member is released to rotate the pivoting member away from the rack, the latching portion rotates to disengage from the clamping protrusion.

13. The mounting apparatus of claim 12, wherein the rack comprises a bottom plate and a fixing plate apart from the bottom plate, two partitions extend from the bottom plate to connect to the fixing plate, the receiving room is bound by the bottom plate, the fixing plate, and the neighboring partitions.

14. The mounting apparatus of claim 13, wherein the resilient member is a torsion spring, and comprises two resisting legs, the resisting legs resist against the fixing plate and the pivoting member, correspondingly.

15. The mounting apparatus of claim 13, wherein the fixing plate defines a cutout communicating with the receiving room, the cutout is aligned with the clamping protrusion, the latching portion is operable to be moved into or out of the cutout to engage with or disengage from the clamping protrusion.

16. The mounting apparatus of claim 12, wherein the pivoting member defines a fixing hole, the rotatable shaft comprises a fixing portion engaged in the fixing hole.

17. The mounting apparatus of claim 16, wherein the rack comprises a clamping unit, the rotatable shaft further comprises a shaft body rotatably received in the clamping unit, the latching portion is located on the shaft body.

18. The mounting apparatus of claim 12, wherein the pivoting member defines a through slot, a post extends from one inner sidewall of the through slot, the resilient member is mounted to the post and received in the through slot.

* * * * *